(12) United States Patent
Horn et al.

(10) Patent No.: US 10,933,594 B2
(45) Date of Patent: Mar. 2, 2021

(54) METHOD FOR FORMING A PART USING A LAYUP TOOL

(71) Applicant: Technical Tooling LLC, Tacoma, WA (US)

(72) Inventors: Zachary S. Horn, Tacoma, WA (US); Robert W. Read, Lakewood, WA (US)

(73) Assignee: Technical Tooling LLC, Tacoma, WA (US)

( * ) Notice: Subject to any disclaimer, the term of this patent is extended or adjusted under 35 U.S.C. 154(b) by 0 days.

(21) Appl. No.: 16/161,702

(22) Filed: Oct. 16, 2018

(65) Prior Publication Data

US 2019/0111639 A1     Apr. 18, 2019

Related U.S. Application Data

(63) Continuation-in-part of application No. 15/913,616, filed on Mar. 6, 2018, now Pat. No. 10,583,536, which is a continuation of application No. 14/881,925, filed on Oct. 13, 2015, now Pat. No. 10,300,569.

(60) Provisional application No. 62/573,882, filed on Oct. 18, 2017, provisional application No. 62/063,816, filed on Oct. 14, 2014.

(51) Int. Cl.
| | | |
|---|---|---|
| *B29C 70/30* | (2006.01) |
| *B29C 33/38* | (2006.01) |
| *B29C 70/46* | (2006.01) |
| *B29C 70/48* | (2006.01) |
| *B29C 70/54* | (2006.01) |
| *B23Q 3/08* | (2006.01) |
| *B23Q 3/06* | (2006.01) |

(52) U.S. Cl.
CPC .............. *B29C 70/30* (2013.01); *B23Q 3/088* (2013.01); *B29C 33/3842* (2013.01); *B29C 70/46* (2013.01); *B29C 70/48* (2013.01); *B29C 70/543* (2013.01); *B23Q 3/065* (2013.01); *B29C 33/3814* (2013.01)

(58) Field of Classification Search
CPC .... B23Q 3/065; B23Q 3/088; B29C 33/3814; B29C 33/3842; B29C 70/30; B29C 70/46; B29C 70/48; B29C 70/543
See application file for complete search history.

(56) References Cited

U.S. PATENT DOCUMENTS 2,617,719 A * 11/1952 Stewart .............. G01N 15/0806
                                                     134/22.18
2,625,886 A * 1/1953 Browne ............... A01B 69/008
                                                     417/390

(Continued)

*Primary Examiner* — Benjamin A Schiffman
(74) *Attorney, Agent, or Firm* — Maschoff Brennan; Jason W. Croft

(57) ABSTRACT

The invention described herein provides a method and material for creating tools surfaces from a granulated material comprised of a particulate and binding material in compositions and ratios described below. The granulated material may be formed using a number of methods and provides for the efficient repair of worn or damaged areas. Additionally, the granulated material may be used by placing it on the surface of a tooling encasement, or may be used by itself without any further structural support. The granulated material may also be used for both forming and trimming/machining of the part to desired tolerances.

13 Claims, 14 Drawing Sheets

(56) References Cited

U.S. PATENT DOCUMENTS

| | | | | |
|---|---|---|---|---|
| 3,146,148 A * | 8/1964 | Mitchella | B21D 47/00 | 156/382 |
| 3,187,444 A * | 6/1965 | Lehmann | B01L 9/06 | 434/298 |
| 3,689,025 A * | 9/1972 | Kiser | F16K 7/16 | 137/906 |
| 3,834,687 A * | 9/1974 | Martin | B23Q 3/08 | 269/13 |
| 3,953,013 A * | 4/1976 | Griffith | B23Q 3/086 | 269/7 |
| 3,968,885 A * | 7/1976 | Hassan | B23Q 7/1431 | 414/591 |
| 4,029,517 A * | 6/1977 | Rand | C23G 5/04 | 134/105 |
| 4,063,705 A * | 12/1977 | Vodra | B29C 33/04 | 156/150 |
| 4,091,643 A * | 5/1978 | Zucchini | D06F 43/02 | 68/18 C |
| 4,355,937 A * | 10/1982 | Mack | H01J 37/18 | 414/217 |
| 4,367,140 A * | 1/1983 | Wilson | B01D 61/06 | 137/544 |
| 4,406,596 A * | 9/1983 | Budde | F04B 43/0736 | 417/393 |
| 4,474,199 A * | 10/1984 | Blaudszun | B08B 7/0092 | 134/1 |
| 4,521,995 A * | 6/1985 | Sekiya | B24B 37/30 | 125/35 |
| 4,541,717 A * | 9/1985 | Itamoto | B25B 11/005 | 356/244 |
| 4,549,467 A * | 10/1985 | Wilden | F01L 5/04 | 137/625.48 |
| 4,597,228 A * | 7/1986 | Koyama | B24B 7/228 | 451/289 |
| 5,576,030 A * | 11/1996 | Hooper | B29C 70/443 | 264/257 |
| 5,645,474 A * | 7/1997 | Kubo | B24B 37/32 | 451/287 |
| 5,730,764 A * | 3/1998 | Williamson | B24D 3/28 | 430/913 |
| 6,012,883 A * | 1/2000 | Engwall | B23Q 3/086 | 409/132 |
| 6,032,997 A * | 3/2000 | Elliott | B25B 11/005 | 269/21 |
| 6,309,587 B1 * | 10/2001 | Gniatczyk | B29C 33/38 | 249/114.1 |
| 7,021,635 B2 * | 4/2006 | Sheydayi | H01L 21/6838 | 269/21 |
| 7,938,466 B2 * | 5/2011 | Joguet | B25J 15/0616 | 294/189 |
| 8,298,473 B2 * | 10/2012 | Dull | B29C 33/18 | 264/511 |
| 8,403,188 B2 * | 3/2013 | Platsch | B05B 7/144 | 141/67 |
| 2003/0194947 A1 * | 10/2003 | Bright | B24B 5/363 | 451/28 |
| 2005/0161861 A1 * | 7/2005 | Lammers | B29B 11/16 | 264/255 |
| 2006/0073677 A1 * | 4/2006 | Nakamura | H01L 21/67092 | 438/460 |
| 2006/0130875 A1 * | 6/2006 | Sheydayi | H01L 21/6838 | 134/10 |
| 2007/0063453 A1 * | 3/2007 | Ishikawa | B24B 37/30 | 279/3 |
| 2009/0008825 A1 * | 1/2009 | Eberth | B29C 31/008 | 264/308 |
| 2016/0184943 A1 * | 6/2016 | Read | B23Q 3/088 | 269/21 |
| 2018/0193968 A1 * | 7/2018 | Read | B23Q 3/088 | |
| 2018/0243870 A1 * | 8/2018 | Read | B23Q 3/088 | |

* cited by examiner

METHOD FOR FORMING A PART USING A LAYUP TOOL

RELATED APPLICATIONS

The present application claims priority to and incorporates by reference as if fully set forth herein U.S. Provisional Application No. 62/573,882 filed on Oct. 18, 2017. The present application is a continuation in part of U.S. application Ser. No. 15/913,616 entitled "METHOD FOR FABRICATING VACUUM FIXTURING USING GRANULAR MEDIA" filed on Mar. 6, 2018, which in turn is a continuation of U.S. application Ser. No. 14/881,925 entitled "METHOD FOR FABRICATING VACUUM FIXTURING USING GRANULAR MEDIA" filed on Oct. 13, 2015, which in turn claims the benefit of U.S. Provisional Application No. 62/063,816 entitled "METHOD FOR FABRICATING VACUUM FIXTURING USING GRANULAR MEDIA" filed on Oct. 14, 2014.

FIELD OF THE INVENTION

The present invention relates to devices and systems for composite material layup and trimming operations applied during the forming and machining of a part or other object.

BACKGROUND OF THE INVENTION

Many industries, including, e.g., the aerospace and automotive industries, require very tight tolerances for the size, shape, and thickness of machined parts. Given the many different parts required in these and other industries, customized tools are often required for each individual part. Separate tools/fixtures are often required to form the materials used to manufacture the parts, as well as a second tool needed for trim operations required to trim the part to a desired shape. These separate layup and trim tools/fixtures are often customized for each individual part.

Conventional tooling processes often require reliable and secure positioning of parts in order to ensure accurate and precise shaping and trimming of the parts. In some applications, this process requires shaping and trimming/cutting of large samples of material into smaller parts with very tight size and thickness tolerances.

One method used to manufacture tight-tolerance parts is the use of vacuum fixtures. The use of vacuum fixtures generally includes the use of a table or tool/tooling having a surface upon which the part to be manufactured is positioned. The conventional manner of preparing the surface of the tool to form the shape of the desired part uses one of several techniques known to those of skill in the art. For example, one such method involves machining the desired surface into a piece of bulk material such as aluminum, steel or tooling board and cutting vacuum channels. Another example involves laying up material over a sample of a desired part to create a negative mold and cutting vacuum channels into the surface. A drawback of the conventional techniques for repairing damage and wear to the surface of the tool is that it results in tools that are difficult, time consuming and expensive. In the machining example, to repair a worn or damage area, the tool would be taken out of service and machined again. In some cases, additional material must be added to the damaged area prior to machining, and in other instances if the damage or wear is significant, the tool may need to be replaced altogether.

In processes where the part is to be comprised of composite materials, such as fiberglass or carbon fiber material, fabrics of suitable weaves and materials are laid into the tool. In some processes, an impermeable material, which may be a membrane, film, mold release, thin sprayable metal or a composite material, is first applied to the tool, then the composite material is placed on top of the impermeable material. In cases where the fabric has not been pre-impregnated with resin, the resin is applied to the layer of fabric. A vacuum pressure is then applied to at least a portion of the interface between the part and the tool to fix the part in place with respect to the tool or table. In processes where an impermeable material is used, vacuum pressure may also be applied to the outside surface of the composite material, typical with the use of a second impermeable material. Then the part is cured using conventional methods known to those of skill in the art, such as applying heat, pressure or both to the combined tool and part. Once the layer is cured, this process is repeated for additional layers of composite material as required.

After curing, the part is trimmed or machined to its final dimensions. In many instances, the vacuum pressure alone is insufficient to hold the part in place with respect to the tool or table, resulting in imperfections in the part during the course of manufacture. For example, sometimes additional tooling pins or alignment tools must also be constructed into the tool (which may not be practical for the layup tool) to achieve the desired tolerances.

To address the above issue, prior methods of using vacuum fixtures to manufacture parts required use of a separate layup tool to layup, cure, and trim composite materials. Typically, the separate tool would allow the user to layup the reinforcing material (e.g., a pre-impregnated fiber) to the tool, then send the tool through cure in an oven or autoclave. The composite material would then be removed from the separate layup tool and affixed to a vacuum fixture where it would be trimmed to net shape. This process was costly for several reasons. For example, the use of separate tools for layup and trim increased cost for both the separate tools and the space in which those tools needed to be stored. Additionally, movement of the composite material to the vacuum fixture could take time, as the vacuum fixture may not be positioned near the layup tool.

BRIEF SUMMARY OF THIS INVENTION

What is needed is a method and apparatus for making tools with easily repairable surfaces. Additionally, this method and apparatus should provide for post-molding trimming and machining without requiring a separate tool.

The invention described herein provides a method and material for creating tools surfaces from a granulated material comprised of a particulate and binding material in compositions and ratios described below. The granulated material may be formed using a number of methods and provides for the efficient repair of worn or damaged areas. Additionally, the granulated material may be used by placing it on the surface of a tooling encasement, or may be used by itself without any further structural support. The granulated material may also be used for both layup and trimming/machining of the part to desired tolerances.

BRIEF DESCRIPTION OF THE DRAWINGS

The present embodiments are described with reference to the accompanying drawings, in which like reference characters reference like elements, and wherein.

DETAILED DESCRIPTION

Various methods and apparatuses for manufacturing machined parts are disclosed that may provide improvements to the manufacturing of machined parts in various industries. These industries may include, but are not limited to, the aerospace, automotive, marine, space, wind power, semiconductor, defense, and/or transportation industries. For purposes of presentation, certain embodiments are disclosed with respect to layup and trimming tools and methods of use, but the disclosed embodiments can be used in other contexts as well. For example, the methods and materials described herein may be used for tooling for parts that do not require layup, such as fixtures for machining or trimming metal, plastic or wood parts. Indeed, the described embodiments are examples only and are not intended to restrict the general disclosure presented and the various aspects and features of this disclosure. The general principles described herein may be applied to embodiments and applications other than those discussed herein without departing from the spirit and scope of the disclosure. This disclosure should be accorded the widest scope consistent with the principles and features that are disclosed or suggested herein.

Although certain aspects, advantages, and features are described herein, it is not necessary that any particular embodiment include or achieve any or all of those aspects, advantages, and features. For example, some embodiments may not achieve the advantages described herein, but may achieve other advantages instead. No feature, component, or step is necessary or critical.

Methods of manufacturing a vacuum fixture will now be described with respect to FIGS. 1-5. The vacuum fixture described in connection to FIGS. 1-5 can be capable of performing each the composite material layup/cure and trimming functions without the use of individual tools for each step. It can additionally be used for machining or trimming for materials not requiring layup as noted above. Utilizing one fixture for each of the layup, cure, and trimming functions can save a great deal of time and cost as compared to the prior methods described above. In some cases, the cost of manufacturing a part can be reduced by an order of magnitude as compared to prior methods.

The method can include, for example, selecting an encasement 12. The encasement 12 can form the frame of the vacuum fixture. In some embodiments, other portion of the vacuum fixture are positioned at least partially within the encasement 12. The encasement 12 can be monolithic or constructed from various pieces of material. Materials such as ceramics, metals, wood, polymers, or some other material or combination of materials may be used to form the encasement.

Figure 1:
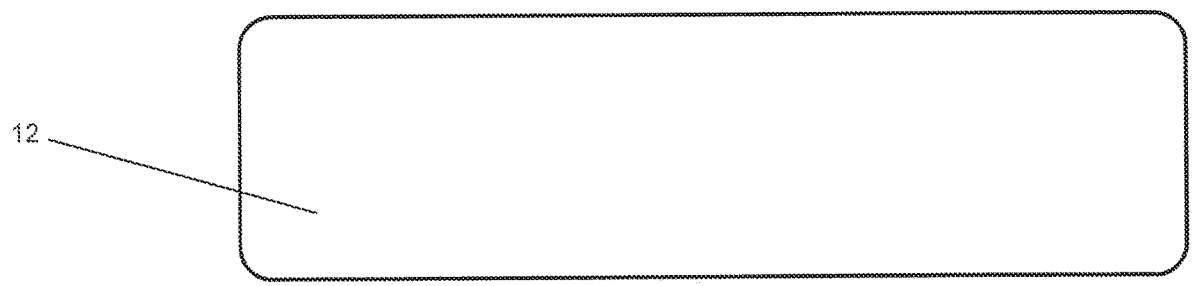
FIG. 1 is a schematic illustration of an encasement for use with a vacuum fixture.
Figure 2:
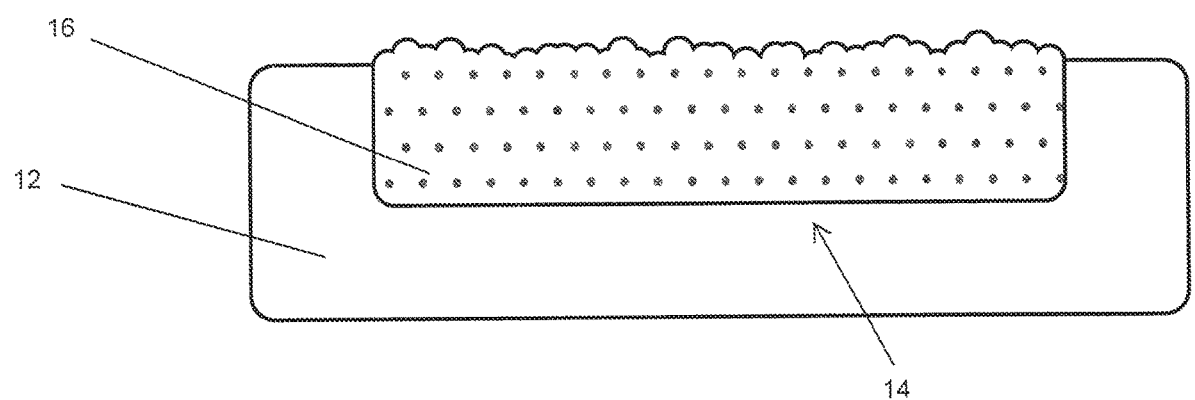
FIG. 2 is a schematic illustration of the encasement of FIG. 1, wherein a cavity is formed and into which granular media is introduced.

As illustrated in FIG. 2, one or more cavities, indentations, channels, and/or apertures may be formed in the encasement 12. For example, a cavity 14 may be formed in the encasement 12. In some embodiments, the cavity 14 or other feature is formed via 3D printing, milling, cutting, machining, or otherwise removing material from the encasement 12. In some embodiments, the cavity 14 is formed by molding, extruding, or otherwise forming the encasement 12 in a manner that creates a cavity 14. In some embodiments, a combination of multiple encasement components can be assembled to form a cavity 14.

Granular media 16 can be introduced into the cavity 14. In some embodiments, the granular media 16 can be introduced such that it overflows from the cavity 14. The granular media 16 can be, for example, a combination of a particulate material and a binding material. The particulate material can be, for example, an abrasive and/or sintered material. In some embodiments, the particulate material is a non-silica particulate (e.g., sand, float ash, nut shells, aluminum oxide, iron oxide, melamine, pumice, silicone carbide, steel grit, urea, garnet, diamond or some other material or combination of materials) or a silica particulate. Typical particles sizes used can, for example, range from 0.002" to 0.075." In some embodiments the particulate material will be abrasive to improve holding ability of the fixture. As used herein, "abrasive" refers to particulate materials having rough (e.g., non-spherical), sharp, or otherwise non-smooth surfaces and/or edges. In other embodiments, particular where small part features are required, non-abrasive particulate materials, such as spherical materials, will be used. The binding material can be an epoxy, resin, polyester, vinyl ester, urethane, polyurethane, methacrylate, methyl methacrylate, paste, and/or other material or combination of materials. The ratio of binding material to particulate material, by weight, can be less than 1:4, less than 1:5, less than 1:7, less than 1:9, less than 1:12, and/or less than 1:19. In some embodiments, the ratio of binding material to particulate material, by weight, is approximately 2:23. The granular media 16 can be configured to be malleable upon initial mixture of the particulate and binding materials and can cure at room temperature. Additionally, various binding materials known to those of skill in the art may be used that will provide malleability of the granular media for various desired time periods prior to being cured. In one embodiment, the granular media may remain malleable for weeks while in another embodiment, for approximately one year. In some embodiments, the granular media 16 has a coefficient of thermal expansion similar to or less than $13 \times 10^{-6}$ in/in $^\circ$ F.

It should be noted that various formulations of the granular media do not require encasement for structural support. In such cases, the granular media does not require an encasement or cavity therein, but rather can be directly formed or otherwise machined by itself, and provide the necessary structure that the figures currently show is being provided by the encasement. In such embodiments, the granular media additionally provides the structural functions of the encasement. When the granular material is used without an encasement, an impermeable material such as a coating, film or membrane may be placed over portions of the granular material to seal those areas to prevent vacuum pressure from escaping. This configuration has the added advantage of not requiring preparation of an encasement or cavity therein.

In some embodiments, the granular media 16 is configured to be repaired, modified, and/or to be supplemented with additional particulate-binding mixture after cure. For example, imperfections in the working surface of the granular media 16, such as divots, eroded surfaces, nicks, cuts, or other imperfections can be filled-in with additional, uncured granular media. At other times, the working surface 17 of the granular media 16 needs to be modified due to part design changes. Adding granular media 16 to the existing vacuum fixture can reduce or eliminate the need for rebuilding the vacuum fixture. The added granular media may be of the same composition and weight ratio of the granular media 16 being repaired. In some embodiments, the added granular media is not the same composition and/or weight ratio as the granular media 16 being repaired. This repair/supplementing process can reduce the need to replace vacuum fixtures wherein the granular media 16 is worn.

Figure 3:
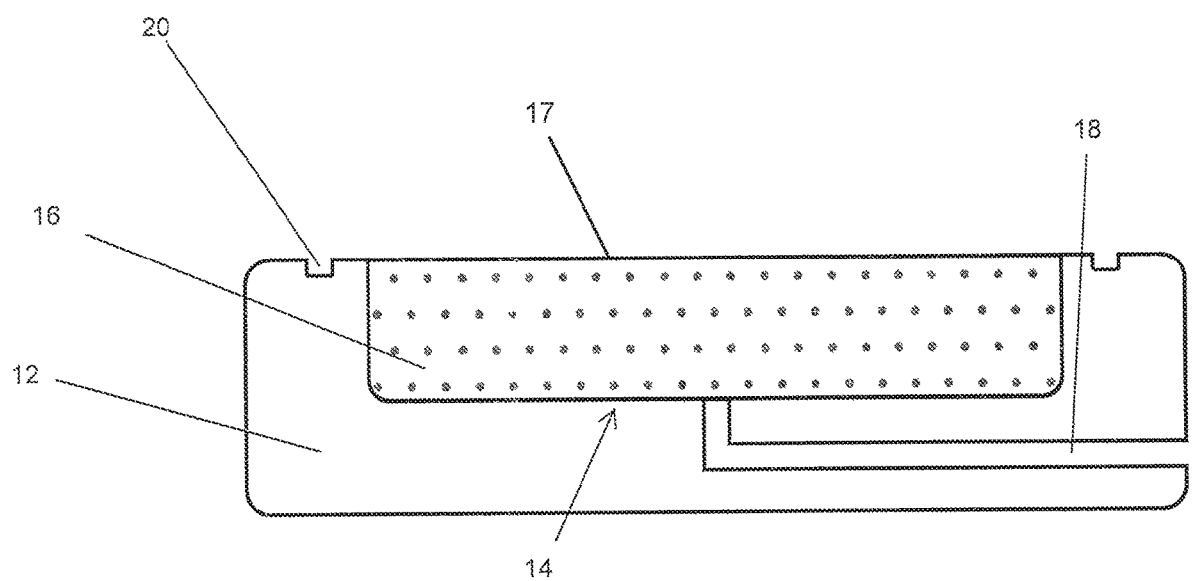
FIG. 3 is a schematic illustration of the encasement and granular media of FIG. 2, further including passages and surface features.
Figure 4:
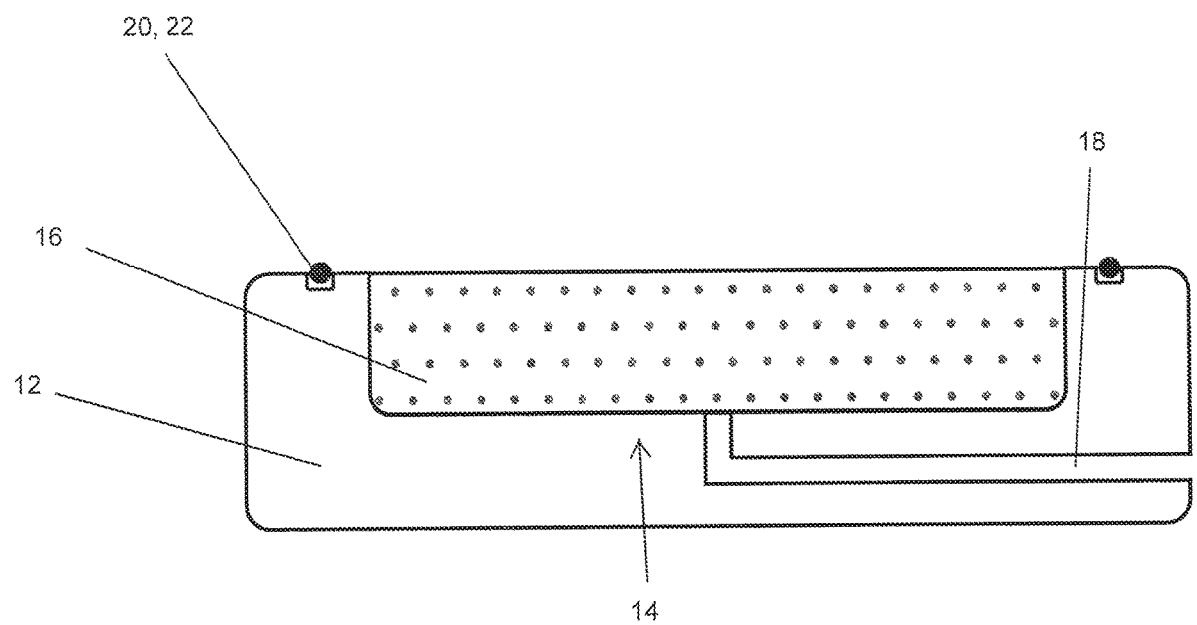
FIG. 4 is a schematic illustration of the encasement and granular media of FIG. 3, wherein a sealing structure is introduced to the surface feature.

As illustrated in FIG. 3, a working surface 17 of the granular media 16 can be formed. For example, the granular media 16 can be milled, ground, cut, or otherwise formed to produce the working surface 17. In some embodiments, the working surface 17 is flat, as illustrated. In some embodiments, the working surface 17 is contoured to match the desired shape of the part to be manufactured. In some embodiments, addition of uncured granular media 16 can be used to change the shape of the working surface 17 of the granular media 16 to accommodate a part having a different shape and/or size. The working surface 17 can be fashioned to be coplanar and/or coincident with the portions of the encasement 12 surrounding the working surface 17. For example, in the flat embodiment illustrated in FIG. 3, the working surface 17 is positioned at the same level (e.g., depth in the vertical direction of FIG. 3) as the surrounding encasement 12. In some embodiments, all or a portion of the working surface 17 extends beyond (e.g., between 0.001" and 0.050" beyond) the portions of the encasement 12 surrounding the working surface 17. Positioning the working surface 17 of the granular media 16 coincident with, coplanar with, or extending slightly beyond the surrounding encasement 12 can facilitate contact between the working surface 17 and the part to be manufactured when the part is mounted to the vacuum fixture. Contact between the part and the working surface 17 of the granular media 16 can increase the coefficient of friction between the part and the vacuum fixture to reduce the likelihood of movement between the part and the vacuum fixture.

One or more passages 18 can be formed in the encasement 12. These passages 18 can be in communication with a source of vacuum pressure. In some embodiments, the vacuum fixture includes a passage 18 having one or more branches between the source of vacuum pressure and the granular media 16. As illustrated, the vacuum fixture can include a single passage 18 having a single interface with the granular media 16. Vacuum pressure supplied by the vacuum pressure source can be distributed through the granular media 16 across all or a portion of the working surface 17.

In some embodiments, one or more channels, indentations, or other surface features can be formed in the encasement 12 surrounding the working surface 17. As illustrated in FIG. 3, a groove 20 may be formed adjacent the working surface 17. The groove 20 can be configured to receive an O-ring 22 (FIG. 4) or other sealing element. Contact between the part to be manufactured and the O-ring 22 can facilitate a vacuum seal between the part and the vacuum fixture. Contact between the part to be manufactured and the working surface 17 can further secure the fixation between the part and the vacuum fixture and can reduce the likelihood of movement between the part and the vacuum fixture. In some embodiments, the strength of the securement between the part and the vacuum fixture using a granular media contacting the part can be an order of magnitude greater than the strength of securement between a part and a vacuum fixture that does not use the granular media 16 described herein.

In some embodiments, instead of or in addition to the groove and O-ring 20, 22 described above, another sealing structure and/or material may be used. For example, a soft, resilient, flexible, and/or high-viscosity layer of material may be applied around the perimeter of encasement 12 surrounding the working surface 17 of the granular media 16. In some embodiments, a thin layer (e.g., 0.002"-0.006") of softer material may be coated along the portions of the encasement 12 surrounding the working surface 17. In some embodiments, the material surrounding the working surface 17 is a tape (e.g., a high-temperature tape). Tape or other sealing material can be used to surround through-holes in the working surface 17 of the granular media 16 on the part being manufactured to form a seal. In some such instances requiring through holes inside the working surface 17 of the granular media 16, a small area of the granular media 16 is machined, milled, or otherwise removed and "potted" with the same or a similar material as the encasement 12.

Figure 5:
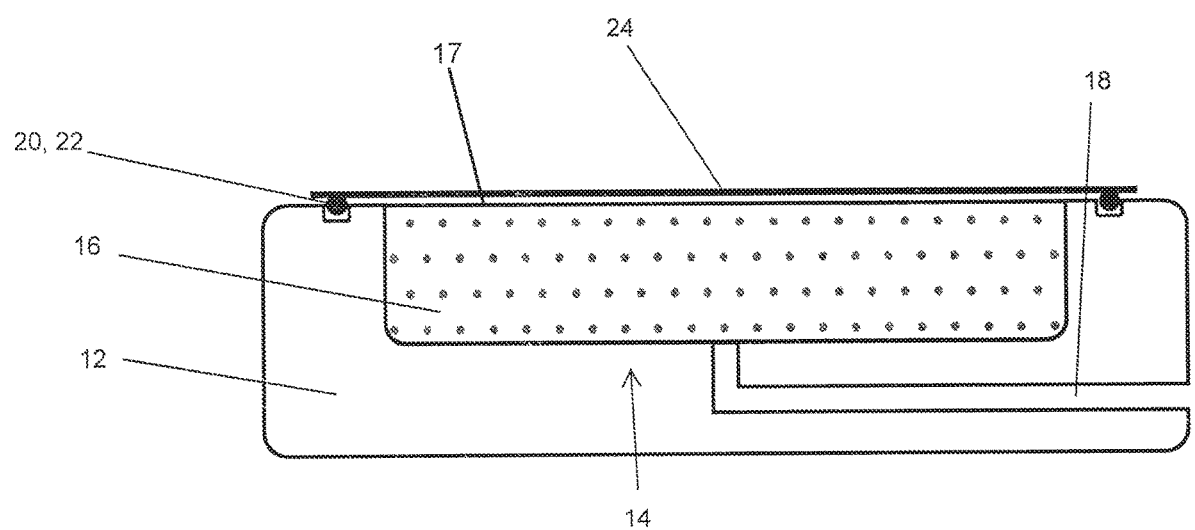
FIG. 5 is a schematic illustration of the assembly of FIG. 4, wherein a material is introduced to contact the granular media.

As illustrated in FIG. 5, a barrier, film, membrane, or other structure can be positioned in contact with the working surface 17 and/or with the seal/O-ring 22. For example, a semi-permanent, impermeable material 24 can be positioned over the working surface 17 of the granular media 16. The impermeable material 24 can be configured to inhibit or prevent bonding between the granular media 16 and the composite material to be processed using the vacuum fixture. The material 24 can be impermeably or substantially impermeable to liquid and/or gas. The impermeable material 24 can be configured to be stable over a range of temperatures and pressures. In some embodiments, the viable working temperatures for the impermeable material 24 can be between $-100^\circ$ F. and $+500^\circ$ F. Viable working pressures for the impermeable material can range between $-1$ bar and $+8$ bar. In some applications, larger ranges for both the working temperature and working pressure of the impermeable material 24 may be used.

The vacuum fixture illustrated in FIGS. 1-5 can be used to perform both a layup of a composite material part, as well as the machining of that part. Upon completion of the assembly of the vacuum fixture, a composite material can be positioned along the impermeable material 24. For example, a reinforcing material (e.g., a woven material, a pre-impregnated woven material, a uni-directional material, or other appropriate reinforcing material) can be placed upon the impermeable material 24. In some embodiments, reinforcing material is not used—the matrix material is cured without a reinforcing material. A membrane/vacuum bag can be placed over the vacuum fixture and a vacuum pressure can be applied to fix the matrix and reinforcing materials to the fixture. The vacuum fixture and/or membrane/vacuum bag can be placed within an oven, autoclave, or other heat source to cure the composite material. All or most of the components of the vacuum fixture can be configured to withstand the heat and pressure of the curing process during cure with little or no adverse effect (e.g., melting, warping, plastic deformation, and/or some other adverse effect).

Upon completion of the layup process, the composite material can be removed from the vacuum fixture. The impermeable material 24 can also be removed from the vacuum fixture. The impermeable material 24 may be used for additional, future layup processes. In some cases, the impermeable material 24 can be a consumable that is replaced with another membrane between layup processes, after a pre-determined number of layup processes, or whenever the condition of the impermeable material 24 degrades below an acceptable quality standard. After removal of the impermeable material 24 and composite material from the vacuum fixture, the composite material can then be re-coupled with the working surface 17 of the same vacuum fixture without the impermeable material 24. Vacuum pressure can be passed through the working surface 17 of the granular media 16 to hold the composite material to the working surface 17. The composite material can be machined to desired sizes and shapes.

The use of a single tool (e.g., the vacuum fixture) to perform both the layup and machining/trim operations can greatly reduce manufacturing costs of machined parts. No longer is a separate layup apparatus required. Further, the speed at which the part can be removed from the fixture, the impermeable material 24 is removed, and the part recoupled with the fixture can greatly reduce labor costs. In some embodiments, the above-described removal and recoupling steps can be performed in under 10 minutes, under 15 minutes, and/or under 20 minutes. In some embodiments, the removal and recoupling steps can be performed in 60 seconds or less.

FIGS. 6-14 illustrate embodiments of methods of manufacturing vacuum fixtures having non-flat (e.g., contoured) working surfaces. Many of the steps in the manufacturing process are similar to or the same as the steps described above with respect to the vacuum fixture illustrated in FIGS. 1-5. Additionally, much of the function described above with respect to the vacuum fixture illustrated in FIG. 1-5 can be performed by the vacuum fixture illustrated in FIG. 6-14.

Figure 6:
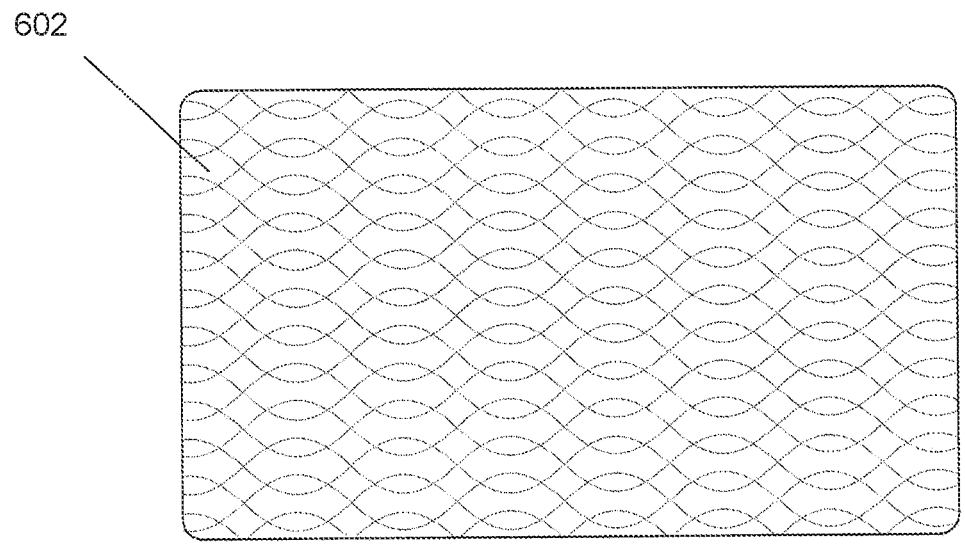
FIG. 6 is a schematic illustration of a forming material.

As illustrated in FIG. 6, a forming material 602 can be selected. The forming material 602, as described in more detail below, can be used to form a negative mold structure for the encasement 612. The forming material 602 may be constructed from a material that is easy to cut, mold, form, or otherwise manipulate. For example, in some embodiments, the forming material 602 is a resin, foam (e.g., Styrofoam®), or other suitable material.

Figure 7:
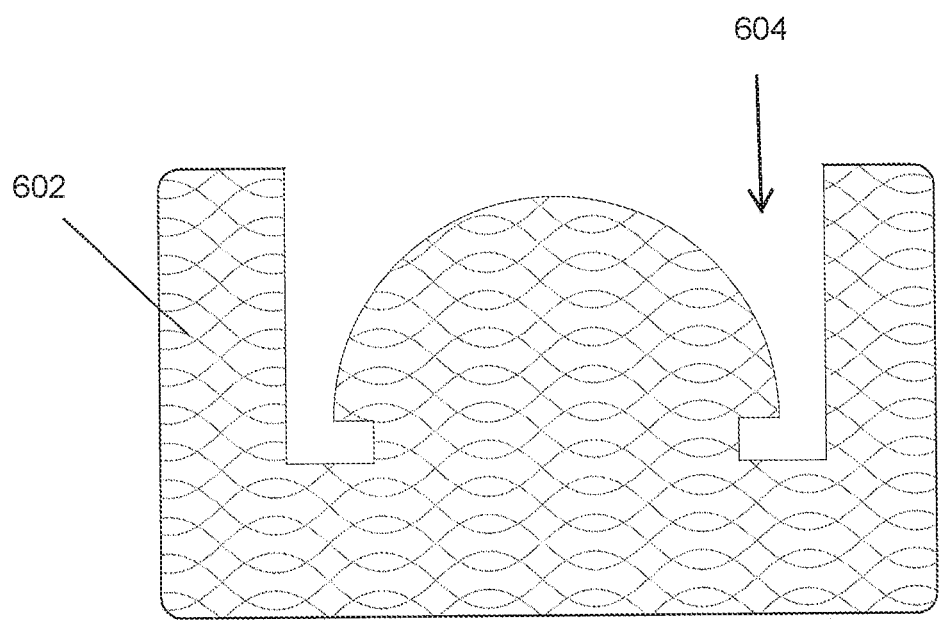
FIG. 7 is a schematic illustration of the forming material of FIG. 6, wherein a negative mold is formed.

As illustrated in FIG. 7, the forming material 602 can be cut to create a negative mold of the desired shape of the encasement. In some embodiments, the negative mold is made by other methods such as injection molding, extruding, or some other suitable method. The overall shape of the encasement can be chosen to match or resemble the shape of the parts to be manufactured using the encasement.

Figure 8:
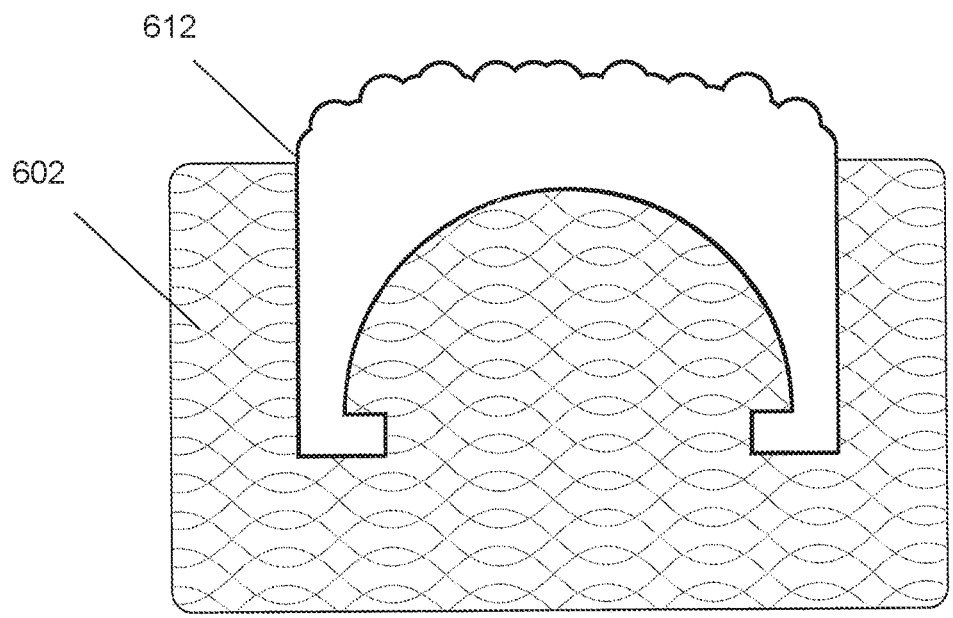
FIG. 8 is a schematic illustration of the forming material of FIG. 7, wherein encasement material is introduced to the negative mold.

As illustrated in FIG. 8, the negative formed in the forming material 602 can at least partially filled with material used for the encasement 612. The encasement material 612 can be allowed to set, and then the forming material 602 can be cut away, melted away, or otherwise removed from the encasement 612.

Figure 9:
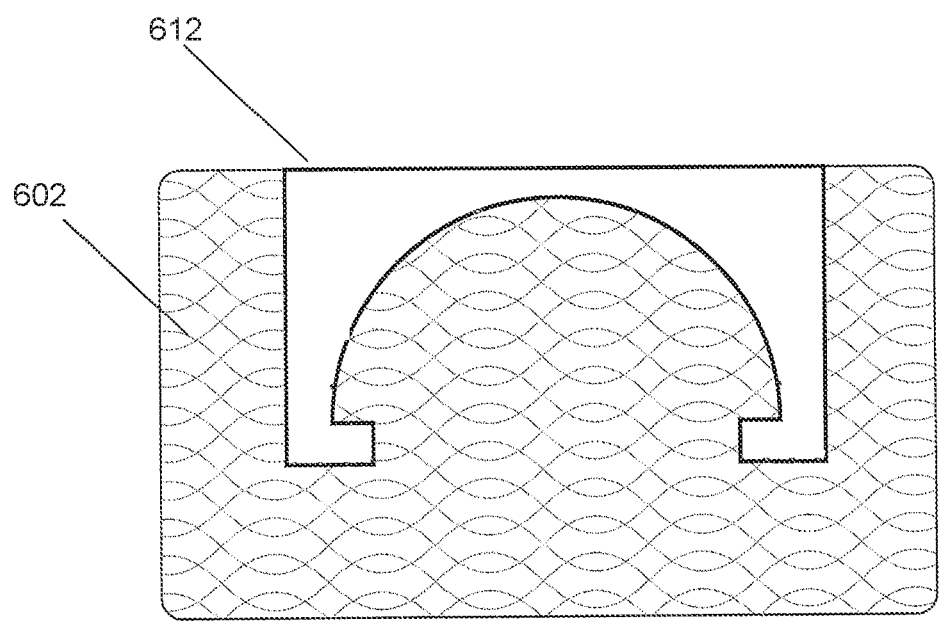
FIG. 9 is a schematic illustration of the forming material and encasement material of FIG. 8, wherein a bottom surface of the encasement is formed as a flat surface.

As illustrated in FIG. 9, the encasement 612 can be trimmed or otherwise shaped to form a desired base configuration. In the illustrated embodiment, the base (e.g., the top surface in the orientation of FIG. 9) is shaped to be flat.

Figure 10:
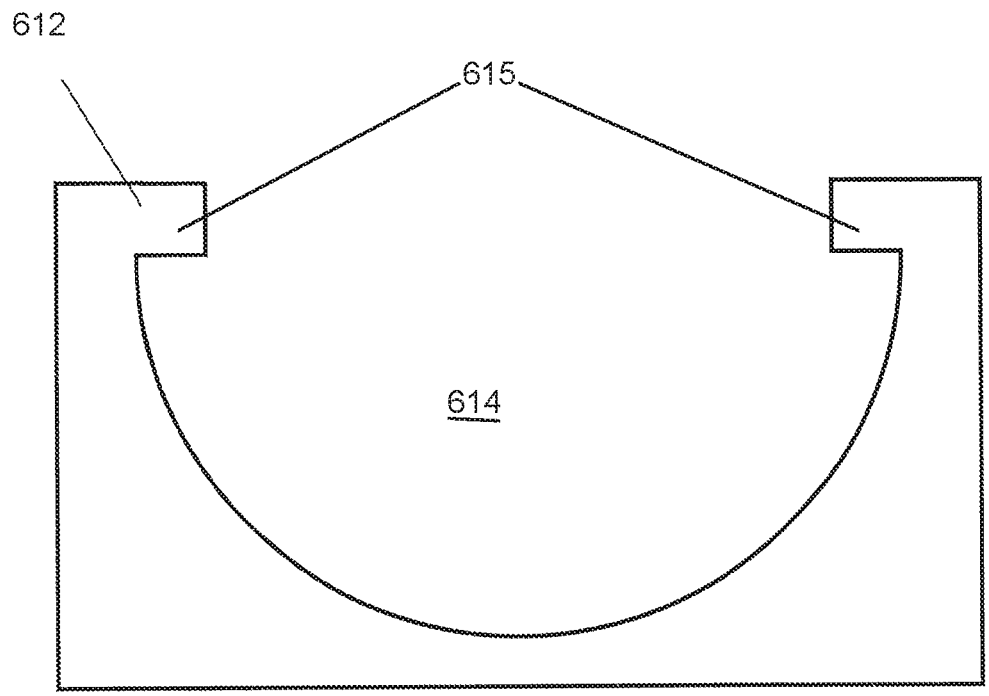
FIG. 10 is a schematic illustration of the encasement of FIG. 9.

The cavity 614 of the encasement 612, as illustrated in FIG. 10, can be formed as a non-flat (e.g., contoured) shape. Although a generally curved or bowl-like shape is illustrated, this shape is non-limiting. The overall shape of the cavity 614 of the encasement 612 can be chosen to resemble or match the shape of the parts to be produced using the encasement. The encasement 612 may be formed with lips, protrusions or other overhangs at the edges of the cavity 614. For example, a flange 615 can be formed on the encasement 612 to serve as the boundary of the cavity 614. In some embodiments, the flange 615 is added to the encasement 612 after the encasement 612 is otherwise formed.

Figure 11:
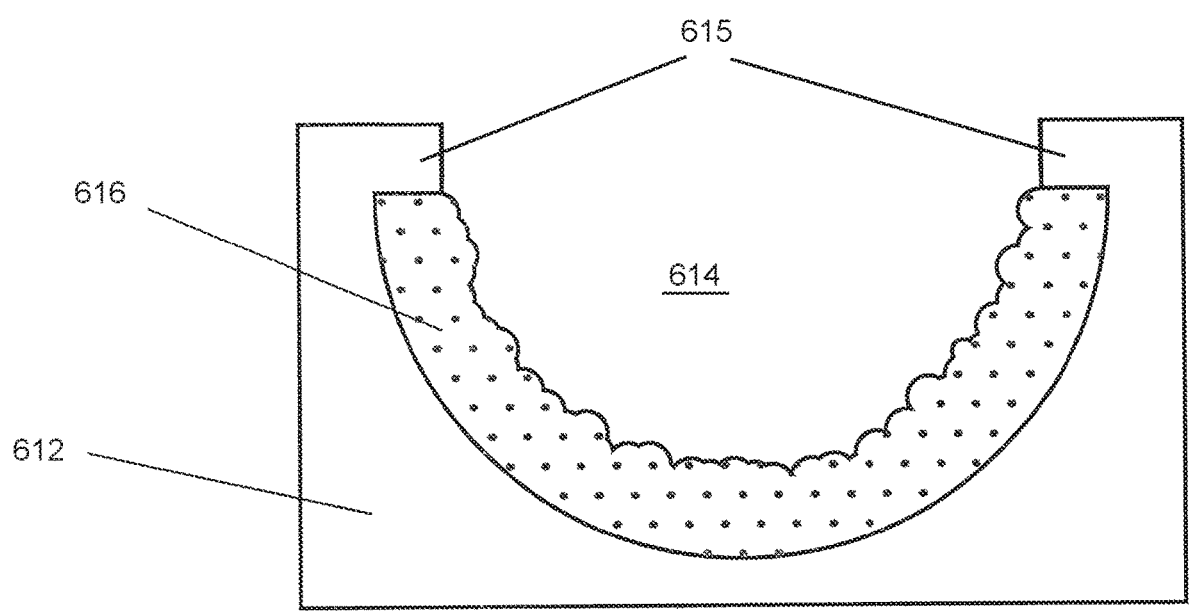
FIG. 11 is a schematic illustration of the encasement of FIG. 9, wherein granular media is introduced to the cavity of the encasement.

As illustrated in FIG. 11, the granular media 616, which can be similar to or the same as the granular media 616 described above, can be introduced into the cavity 614. The granular media 616 can be shaped to generally align with the contoured surface of the cavity 614.

Figure 12:
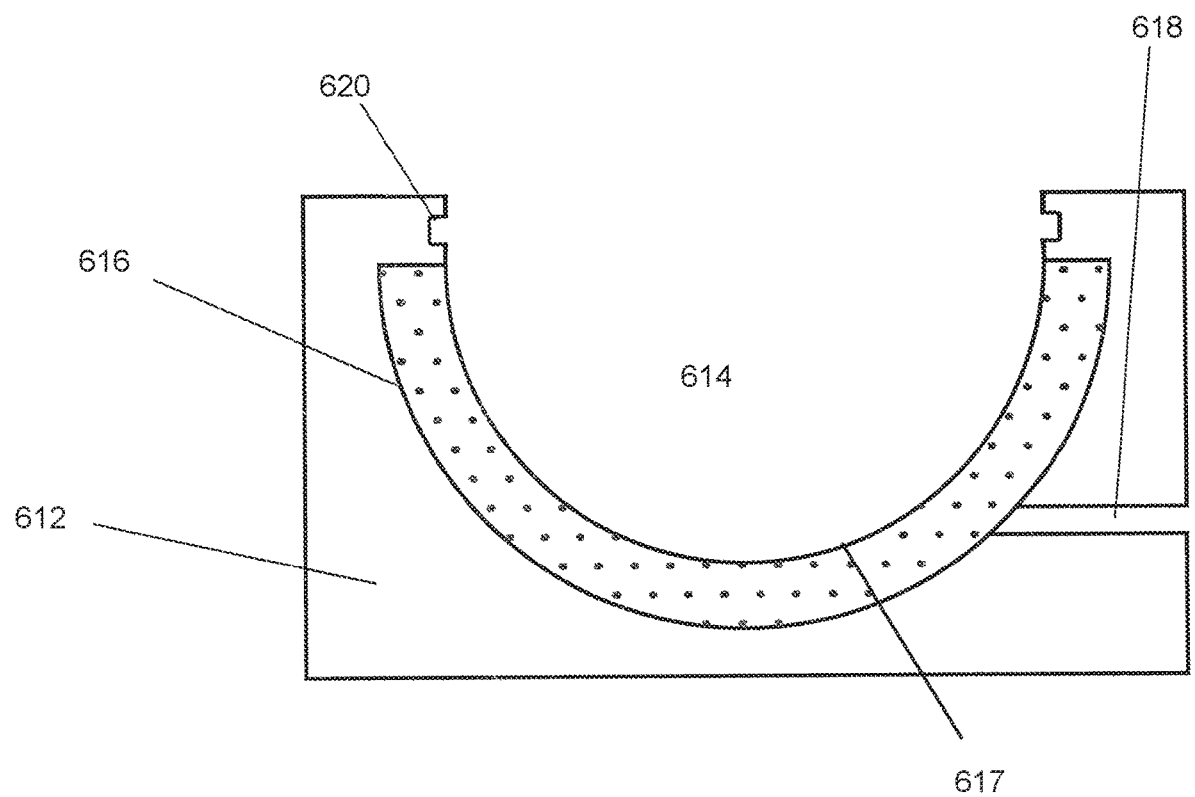
FIG. 12 is a schematic illustration of the encasement and granular media of FIG. 11, wherein a groove and passage are formed in the encasement.

As illustrated in FIG. 12, the granular media 616 can be cut, trimmed, or otherwise formed to have a working surface 617. The working surface 617 of the granular media 616 can be shaped to generally match the contour of the cavity 614. The contour of the cavity 614 can be formed to be larger than, but otherwise the same shape as the desired part to be manufactured using the vacuum fixture. In some embodiments, the working surface 617 is formed to match the shape of the desired part to be formed but is shaped differently from the contours of the cavity 614. The working surface 617 can be formed such that edges of the working surface 617 are coincident with the flanges 615.

Figure 13:
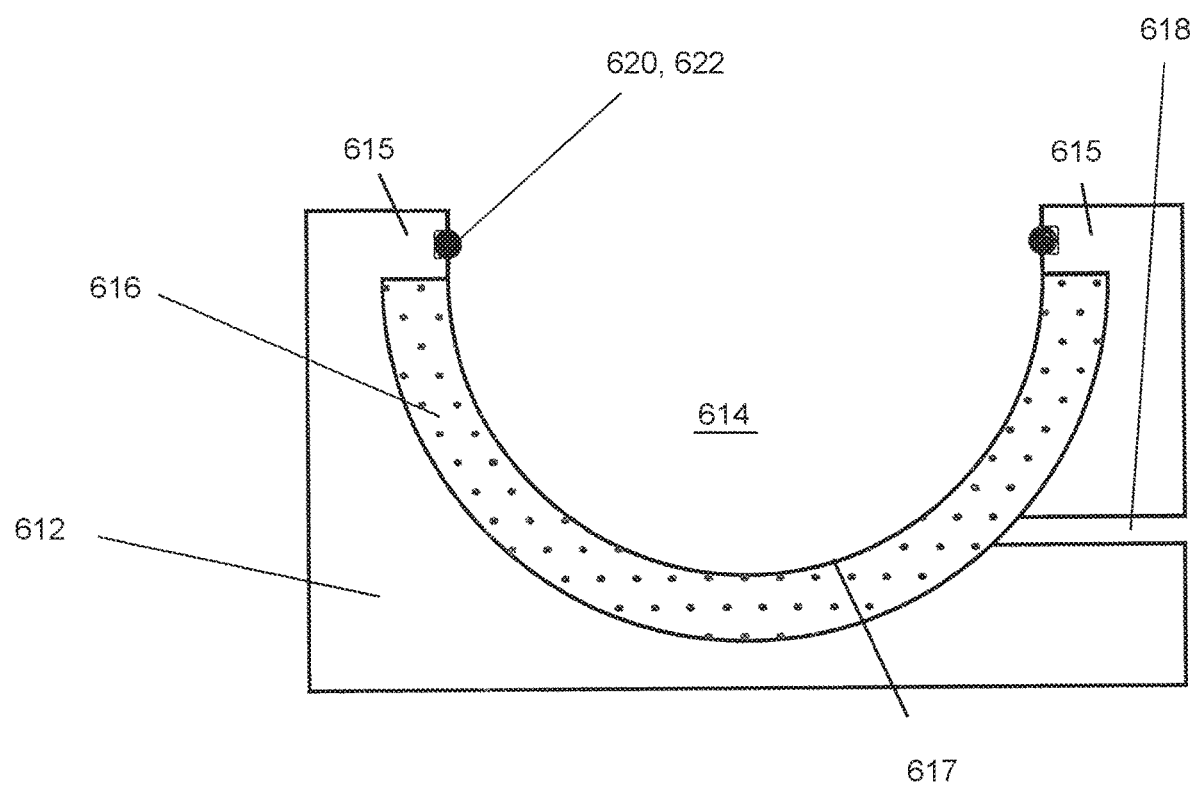
FIG. 13 is a schematic illustration of the encasement of the encasement and granular media of FIG. 12, wherein a sealing structure is introduced to the groove.

One or more grooves 620 can be formed in the flanges 615 and/or elsewhere on the encasement 612. The grooves 620 can be configured to receive a sealing structure such as, for example, an O-ring 622 (FIG. 13). In some embodiments, instead of or in addition to the groove and O-ring 620, 622 described above, another sealing structure and/or material may be used. For example, a soft, resilient, flexible, and/or high-viscosity layer of material may be applied around the perimeter of encasement 612 surrounding the working surface 617 of the granular media 616 (e.g., upon the flange(s) 615 of the encasement 612). In some embodiments, a thin layer (e.g., 0.002"-0.006") of softer material may be coated along the portions of the encasement 612 surrounding the working surface 617. In some embodiments, the material surrounding the working surface 617 is a tape (e.g., a high-temperature tape). Tape or other sealing material can be used to surround through-holes on the part being manufactured to form a seal.

As described above, a passage 618 for introduction of vacuum pressure can be formed in the encasement 612. The vacuum pressure can be passed through the granular media 616 to pull the part to be manufactured toward the working surface 617 of the granular media 616 during the trimming process. Contact between the part and the seals (e.g., the O-ring 622, tape, applied material, and/or other sealing material or structure) of the vacuum fixture can increase the vacuum pressured applied to the part. Contact between the working surface 617 and the part can increase the coefficient of friction between the part and the vacuum fixture to reduce the likelihood that the part moves with respect to the fixture during the trimming process.

Figure 14:
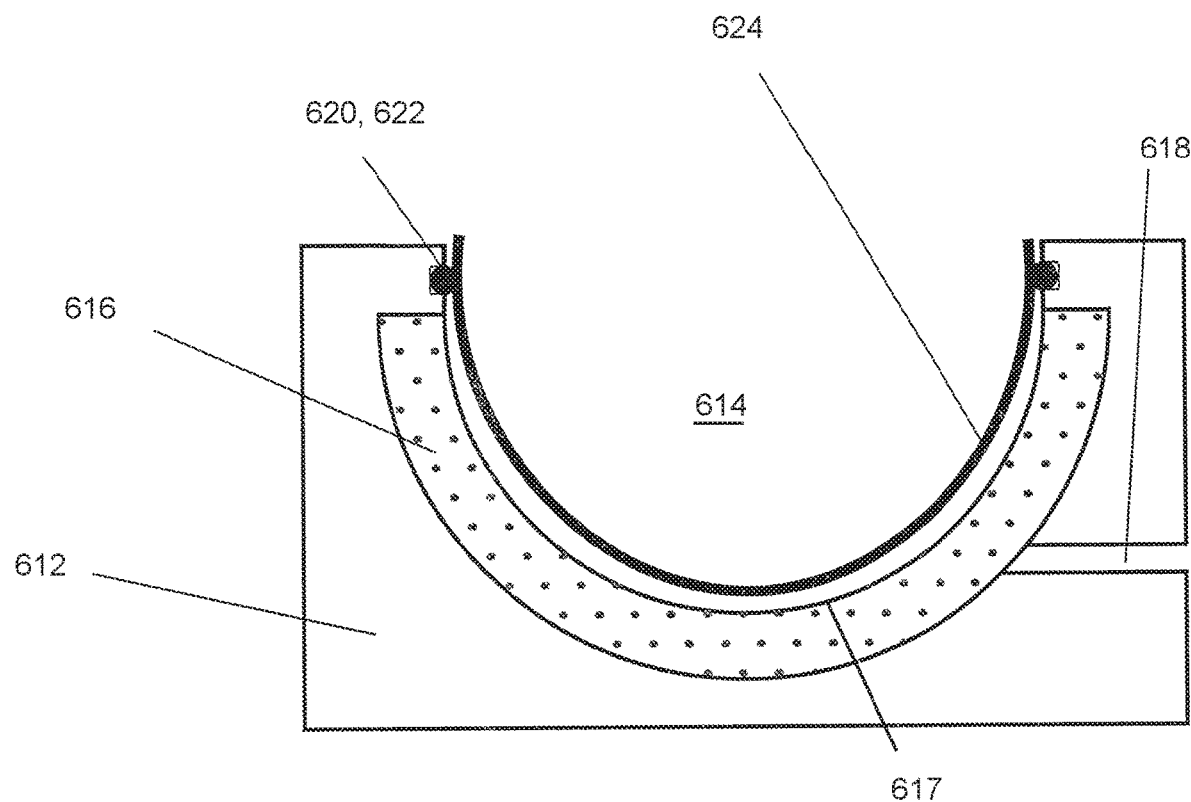
FIG. 14 is a schematic illustration of the assembly of FIG. 13, wherein a material is introduced to contact the granular media.

As illustrated in FIG. 14, a membrane 614 can be positioned in contact with one or both of the working surface 617 of the granular media 616 and the seal/O-ring 622. In order to form the illustrated contoured shape, the membrane 614 may be pleated, darted, stretched, or otherwise formed to cover all or a portion of the working surface 617. The membrane 624 can function in a same or similar manner as the impermeable material 24 described above. For example, the membrane 624 can reduce or eliminate the risk of bonding between the granular media 616 and the composite material to be processed using the vacuum fixture.

Overall, the function of the vacuum fixture illustrated in FIG. 14 can be the same as the function of the vacuum fixture illustrated in FIG. 5 and described above. One notable difference between the two vacuum fixtures is the use of a contoured cavity 614 and working surface 617 in the fixture of FIG. 14.

Terms of orientation used herein, such as "top," "bottom," "horizontal," "vertical," "above," "below," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include, or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately," "about," and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Certain features that are described in this disclosure in the context of separate implementations can also be implemented in combination in a single implementation. Conversely, various features that are described in the context of a single implementation can also be implemented in multiple implementations separately or in any suitable sub-combination. Although features may be described above as acting in certain combinations, one or more features from a claimed combination can, in some cases, be excised from the combination, and the combination may be claimed as any sub-combination or variation of any sub-combination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. The figures are drawn and/or shown to scale, but such scale should not be limiting, since dimensions and proportions other than what are shown are contemplated and are within the scope of the present disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of vacuum fixtures have been disclosed. Although the fixtures have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another.

What is claimed is:

1. A method for forming a part using a layup tool comprising:
   creating a granular media comprised of a particulate material and a binding material;
   forming at least a surface of the layup tool using the granular media wherein the surface reflects a desired shape of the part to be manufactured;
   curing the granular media;
   receiving onto the surface of the layup tool a material from which the part will be formed; and,
   using the surface of the layup tool to aid in forming the material to the shape of the part.

2. The method of claim 1 wherein receiving onto the surface of the layup tool the material from which the part will be formed further comprises:
   applying an impermeable material onto the surface of the layup tool;
   and applying a composite material onto the impermeable material.

3. The method of claim 2 wherein using the surface of the layup tool to aid in forming the material to the shape of the part further comprises:
   providing a vacuum pressure through the layup tool to cause the impermeable material to conform to the shape of the layup tool.

4. The method of claim 3 wherein after forming the material to the shape of the part:
   trimming or machining the material to the desired part dimensions using the same layup tool.

5. The method of claim 1 wherein the layup tool is primarily comprised of the granular media, further comprising:
   sealing at least some portions of the granular media that do not interface with the part to prevent vacuum pressure from leaking through the sealed portions.

6. The method of claim 1 wherein forming at least a surface of the layup tool using the granular media wherein the surface reflects a desired shape of the part to be manufactured further comprises:
   forming an encasement onto which the surface of granular media is formed.

7. The method of claim 1 wherein using the surface of the layup tool to aid in forming the material to the shape of the part comprises:
   using the surface of the layup tool to hold the material in a fixed position; and,
   marking, milling, cutting, machining, or otherwise removing portions of the material to form the part.

8. The method of claim 1 further comprising:
   repairing worn or damaged portions of the layup tool by adding granular media to the worn or damaged portions;
   conforming the added granular media to the surface of the layup tool; and,
   curing the added granular media.

9. The method of claim 1 further comprising:
   modifying the layup tool by adding granular media to the surface of the layup tool; and,
   curing the added granular media.

10. The method of claim 1 where creating a granular media comprised of an abrasive particulate material and a binding material comprises:
    combining the binding material with the abrasive particulate material in a ratio of binding material to abrasive particular material by weight of between 1:4 and 1:19.

11. The method of claim 1 wherein the particulate material comprises particles with sizes ranging from 0.002" to 0.075".

12. The method of claim 1 where prior to curing, the granular media remains malleable at room temperature for longer than two weeks.

13. The method of claim 1, wherein the material from which the part will be formed includes at least one of carbon fiber, fiberglass, a composite material, or a plastic material.

* * * * *